United States Patent [19]
Viaud et al.

[11] Patent Number: 5,315,925
[45] Date of Patent: May 31, 1994

[54] ROUND BALER HAVING IMPROVED BALE CORE STARTING STRUCTURE

[75] Inventors: Jean Viaud, Sarreguemines; Arsene Roth, Walschbronn, both of France

[73] Assignee: Deere & Company, Moline, Ill.

[21] Appl. No.: 56,975

[22] Filed: May 3, 1993

[30] Foreign Application Priority Data

May 9, 1992 [DE] Fed. Rep. of Germany ....... 4215308

[51] Int. Cl.[5] ......................... B30B 5/06; A01D 39/00
[52] U.S. Cl. ........................................ 100/88; 53/118; 56/341
[58] Field of Search .................... 100/5, 87, 88, 89; 53/118, 587; 56/341

[56]     References Cited
U.S. PATENT DOCUMENTS

| | | | |
|---|---|---|---|
| 2,627,223 | 2/1953 | Berge | 100/88 X |
| 3,722,197 | 3/1973 | Vermeer | 56/341 |
| 3,914,926 | 10/1975 | Braunberger et al. | 56/341 |
| 4,252,057 | 2/1981 | Gaeddert et al. | 100/88 |
| 4,336,750 | 6/1982 | White et al. | 100/88 |
| 4,402,259 | 9/1983 | Viaud | 100/88 X |
| 4,550,557 | 11/1985 | Vissers et al. | 56/341 |
| 4,633,659 | 1/1987 | Anstey et al. | 56/341 |
| 4,766,717 | 8/1988 | Thomann | 56/341 |

FOREIGN PATENT DOCUMENTS

| | | | |
|---|---|---|---|
| 2368214 | 6/1978 | France | 100/89 |
| 2460099 | 2/1981 | France | 56/341 |
| 8501416 | 12/1986 | Netherlands | 100/88 |
| 1301350 | 4/1987 | U.S.S.R. | 56/341 |
| 1429979 | 10/1988 | U.S.S.R. | 56/341 |

Primary Examiner—Stephen F. Gerrity

[57]     ABSTRACT

A round baler includes an expansible, upwardly converging wedge shaped bale chamber having an opening at its bottom and being formed in part by first and second belt runs that respectively converge upwardly from first and second belt support rolls respectively located at the front and rear of the inlet opening. Expansion of the baling chamber works against a downwardly biased tensioning frame pivotally mounted to opposite side walls, the first and second belt runs extending between a fixed and a pivotal roll carried by the frame with the pivotal roll being controlled to move closer to the fixed roll as the tensioning frame is forced upwardly by a growing bale. A fingered rake structure bridges the gap between the fixed and pivotal rolls to keep crop material from exiting the chamber. A crop braking structure is mounted above the first belt support roll and includes fingers projecting downwardly between the belts of the first run of belts and into the opening to the chamber to impede the flow of crop being carried downwardly by the first run of belts. An alternate feeding structure may be mounted to the baler below and rearwardly of the first belt support roll and includes feeding lugs extending through slots defined by stripper vanes, the vanes having ends of the crop braking fingers received therein and cooperating with the fingers to form a smooth crop engaging surface.

12 Claims, 3 Drawing Sheets

ROUND BALER HAVING IMPROVED BALE CORE STARTING STRUCTURE

BACKGROUND OF THE INVENTION

The present invention relates to a round baler having an expansible baling chamber formed by belts having front and rear spans that converge upwardly to define a wedge shaped baling chamber and more particularly relates to structure for forming a bale core in such a baling chamber.

U.S. Pat. No. 4,633,659, issued 6 Jan. 1987, discloses a round baler having a wedge shape baling chamber that opens at the bottom and is supplied by a pick-up. Located in the forward lower region of the chamber is a so-called starter roll arranged to contribute in bringing the supplied crop into rotation to form a bale a bale core. The front and rear regions of the baling chamber are defined by first and second spans of a plurality of side-by-side mounted belts. At the beginning of the process of forming the bale, a vortex of crop to be baled develops within the baling chamber on the basis of which a bale core should develop. Under unfavorable harvesting conditions, clogging can occur in the supply to the baling chamber.

SUMMARY OF THE INVENTION

According to the present invention there is provided, in combination with a round baler having an expansible bale chamber to which crop is fed through a bottom inlet, an improved structure for more reliably forming the core of a bale.

An object of the invention is to provide a round baler having an expansible baling chamber of the aforementioned design which incorporates a movable roll in the belt tensioning structure which permits limited expansion of the upper portion of the chamber during the formation of the bale core.

A more specific object of the invention is to provide a moveable roller, as set forth in the preceding object, to which a linkage is fixed for controlling the roll so that the latter acts, together with a fixed roll, to increasingly close the top of the baling chamber as the bale grows and forces the tensioning frame upwardly.

Yet another object of the invention is to provide a finger or rake structure for bridging the gap between the fixed and pivotable rolls, as defined in the immediately preceding object, so as to retain crop material within the baling chamber.

Another object of the invention is to provide a baler as set forth in the foregoing objects which also incorporates crop braking fingers respectively projecting downwardly into the baling chamber between belts at a location where the belts engage a first belt support roll located at the forward portion of the baling chamber opening.

Another specific object of the invention is to provide a baler as set forth in the immediately preceding object wherein the first belt support roll is at least 1.5 times the size of a second support roll located at the rear side of the baling chamber opening.

These and other objects will become apparent from a reading of the ensuing description together with the appended drawings.

DESCRIPTION OF THE PREFERRED EMBODIMENT

Figure 1:
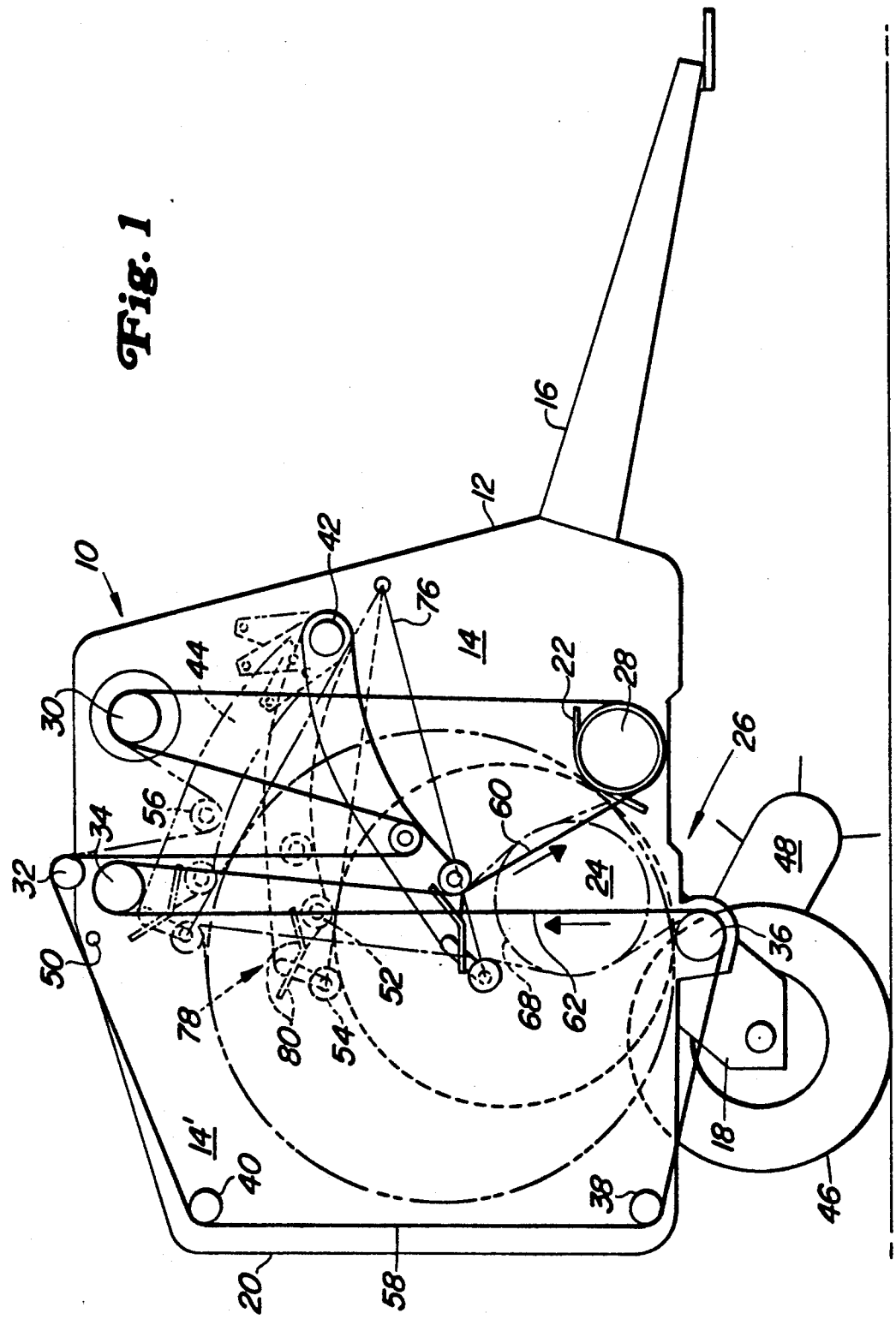
FIG. 1 is a schematic right side elevational view of a round baler incorporating a belt tensioning frame having a roll pivotally mounted thereto in accordance with the present invention.

Referring now to FIG. 1, there is shown a round baler 10 having a frame 12 to which side walls 14, a tow bar 16 and a support axle 18 are rigidly attached. The tow bar 16 connects the round baler 10 with a prime mover, not shown. A discharge gate 20 is mounted to the rear of the frame 12 and includes side walls 14' respectively forming extensions of the walls 14 when the gate 20 is in a closed position, as shown.

The side walls 14 of the frame 12 and the side walls 14' of the discharge gate 20 enclose a baling chamber 24 at its sides while front and rear walls of the chamber 24 are respectively defined by front and rear spans of a plurality of belts supported in a known manner, to be described, so that they converge upwardly. The chamber 24 thus defined is in the shape of an upwardly narrowing wedge and includes an inlet opening 26 at its bottom. For supporting the belts, a multitude of rolls are mounted in the walls 14 and 14' so as to be fixed radially in rigid bearings but free to rotate. Specifically, a first lower roll 28, an upper forward roll 30, an upper central roll 32 and an upper rear roll 34 are provided between the side walls 14. Between the side walls 14' of the discharge gate 20 there are located a second lower roll 36, a lower rear roll 38 and an upper roll 40. Finally, the side walls 14 retain an axle 42, fixed against rotation, which extends over the entire intervening space and which supports a rearwardly extending frame 44 for free pivotal motion.

Two wheels 46 are mounted for free rotation on the support axle 18 which extends beyond the side walls 14,14'. On the forward side of the support axle, an intake conveyor 48 in the shape of a pick-up is mounted, preferably for free vertical pivotal movement, which takes up crop lying on the ground that is to be baled and conveys it to the baling chamber 24. The intake conveyor 48 has its rear end immediately adjacent to the second lower roll 36 and represents a certain lower boundary of the baling chamber 24. Accordingly, between the first lower roll 28 and the second lower roll 36 there is no starter roll or drums, as is known from the state of the art, on which the crop could be supported. Once the bale core is formed, the growing bale will eventually engage the first lower roll 28. The roll 28 is shown (FIG. 1) as having a diameter about twice that of the remaining rolls. With this diameter, the pressure exerted on the roll 28 by the bale is spread over a relatively large contact area so that the roll can rotate more easily and thus suffers less deformation.

The discharge gate 20 can pivot vertically about a bearing 50 located rearwardly of and above the upper rear roll 34, along with the rolls 36, 38 and 40, for which purpose hydraulic cylinders, not shown, are applied and actuated in a known manner.

The pivoting frame 44 extends from the axle 42 to the gate 20 and can pivot vertically against the force of a spring not shown, or a hydraulic cylinder or both of these. Within the pivoting frame 44 there extend across the width of the baling chamber 24 a third roll 52, a fourth roll 54 and a further roll 56, each of which is supported for free rotation in the pivoting frame 44 and for vertical pivotal movement with the frame.

A set of several, coplanar parallel belts 58 extend over the rolls 28–40 and 52–56 and include a first belt span 60 that runs from the first roll 28 to the third roll 52 and then to the roll 34, and a second belt span 62 that runs from the roll 36 to the fourth roll 54 and then to the roll 34. The belts 58 operate in the direction from the roll 36 to the roll 34, and from the roll 34 to the roll 28. Although in this embodiment a single set of belts 58 is provided that runs over the rolls 28–40, 52–56, it is also possible to use two sets of belts that meet in the area of the roll 34.

If the fourth roll 54 is not used, it is also possible to replace the belts in the region of the gate 20 with rolls or chains that combine with the belts 58, provided between the walls 14, to enclose a baling chamber whose variation in size may be limited.

Figure 2:
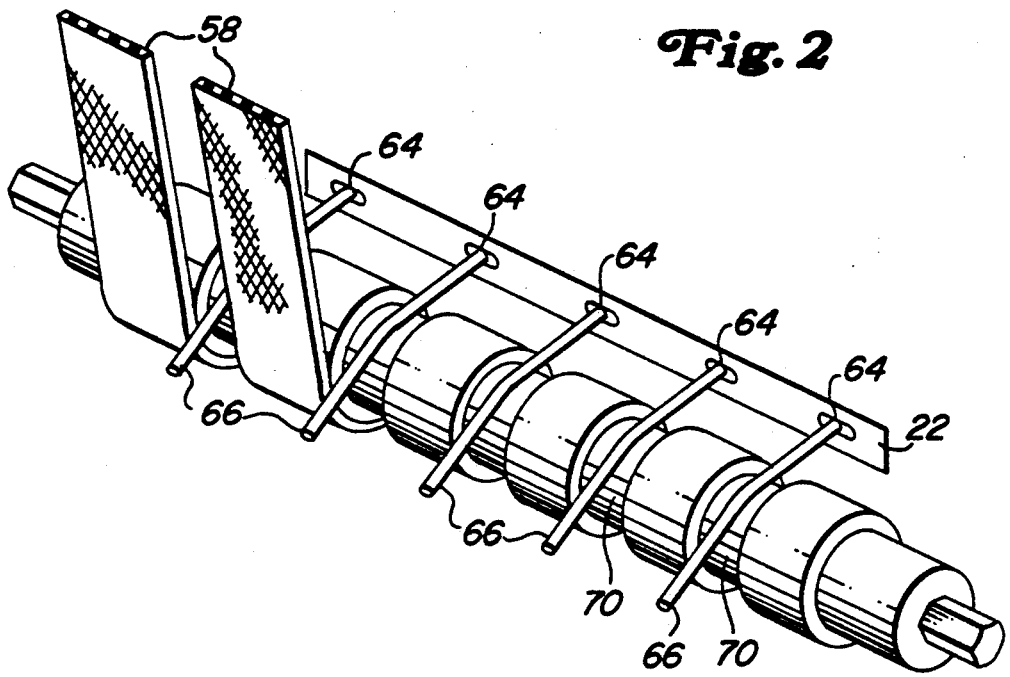
FIG. 2 is a perspective view showing the lower front belt support roll engaged by two of the plurality of belts spans and the finger assembly.

A transverse strut 22 extending above the lower roll 28 is shown in greater detail in FIG. 2, and is provided with a multitude of openings 64 along its length through which extend fingers 66. The fingers 66 are rigidly attached to the transverse strut 22 by means of nuts, not shown, or the like. In this embodiment, the fingers 66 are configured as flexible, round steel fingers and extend between gaps between the belts 58 into the baling chamber 24. The fingers 66 could as well be made from reinforced plastic or from wood, particularly as either a round or flat profile. The segment of the fingers 66 extending into the baling chamber 24 is oriented at an obtuse angle to the upstream region of the second belt span 62, in such a way that they do not come into contact with a bale 68 (FIG. 1) even when the latter is almost fully formed and is supported on the first lower roll 28.

In order to avoid excessive friction between the fingers and the roll 28, grooves 70 are machined or otherwise formed radially in the roll 28 so as to be located in alignment with the gaps between the belts 58, the grooves 70 being wider and deeper than the thickness of the fingers 66. Thereby the growing bale is supported on the first roll 28 or the belts 58 running thereon, while the fingers remain unloaded in the grooves without being forced against the bottom of the grooves. It is to be noted that the fingers 66 make an obtuse angle with the upstream portion of the belt span 60 so that crop does not build up on the fingers but rather slides therealong, the bend in the fingers advantageously resulting in the fingers being engaged or loaded by crop only at the beginning of the baling process. It is further to be noted that the fingers are not to extend too far into the baling chamber. At least the circumferential surface of the roll 28 is rubberized in order to create high friction against the belts 58. This rubberized coating also permits easier machining of the grooves 70. The outside diameter of the roll 28 is very large in comparison to the other rolls 30–40, 52–56, resulting in a large contact surface for the cylindrical bale 68.

Figure 3:
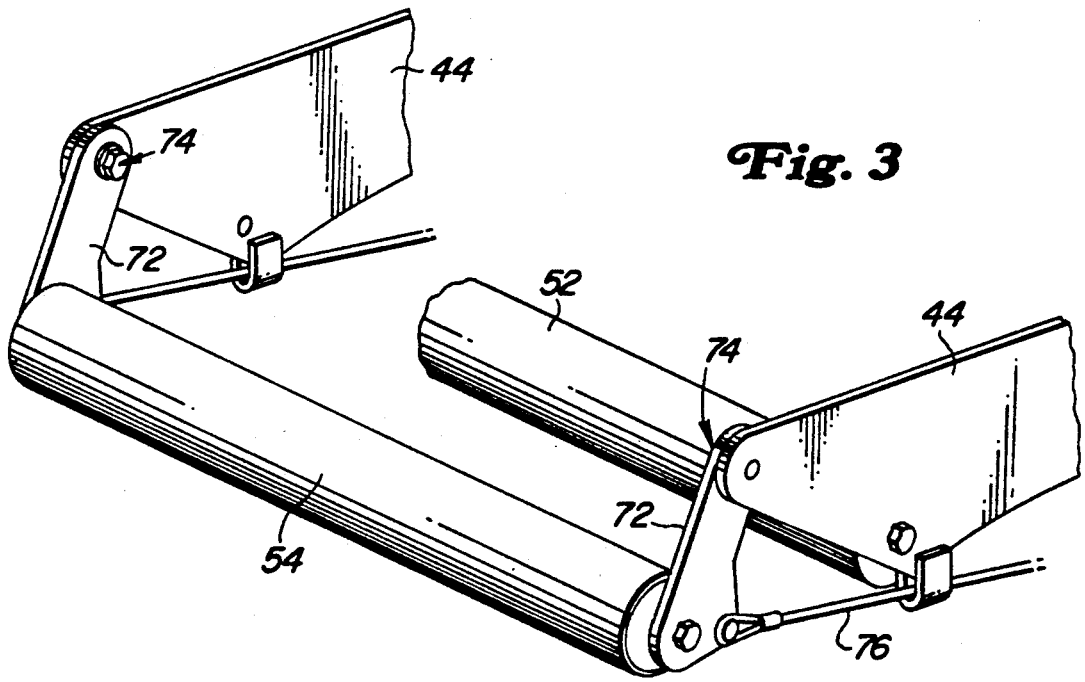
FIG. 3 is a perspective view showing an end of a tensioning frame assembly.

FIG. 3 shows a section of the pivoting frame 44 with the third and fourth rolls 52 and 54, respectively. The third roll 52 is attached to the pivoting frame 44 in such a way as to be radially fixed but free to rotate. The fourth roll 54 is mounted in such a way that it is initially permitted to deflect a predetermined amount away from the roll 52 so that additional volume is presented for taking in crop so as to avoid a blockage of the crop to be baled in the region of the inlet. Specifically, the fourth roll 54 extends between and is rotatably mounted to first ends of a pair of links 72 having their respective second ends mounted for pivoting about bolts 74 attached to the pivoting frame 44. As can be seen in FIG. 1, a linkage 76, configured as a wire rope or cable 76, extends between each of the links 72 and the frame 12. The attaching point of each linkage 76 on the frame 12 is located below a respective end of the axle 42 and above the inlet opening 26, so that the fourth roll 54 is pivoted toward the third roll 52 as soon as the pivoting frame 44 moves upward. Thus, the control of the movable roll 54 is accomplished automatically during the pivoting process; otherwise a reversing link or independent control arrangement operating correspondingly would have to be provided.

In addition, FIG. 1 shows that between the third and fourth roll 52, 54 a rake of fingered structure 78 extends over the entire width of the pivoting frame 44 and includes a plurality of fingers received in or disposed for reception in the gaps between the belts, the fingers each including two sections 80, directed upward and originating at a central bend. This rake 78 closes the gap between the third and fourth rolls 52, 54 and thereby encloses the baling chamber 24 in the upward direction.

Figure 4:
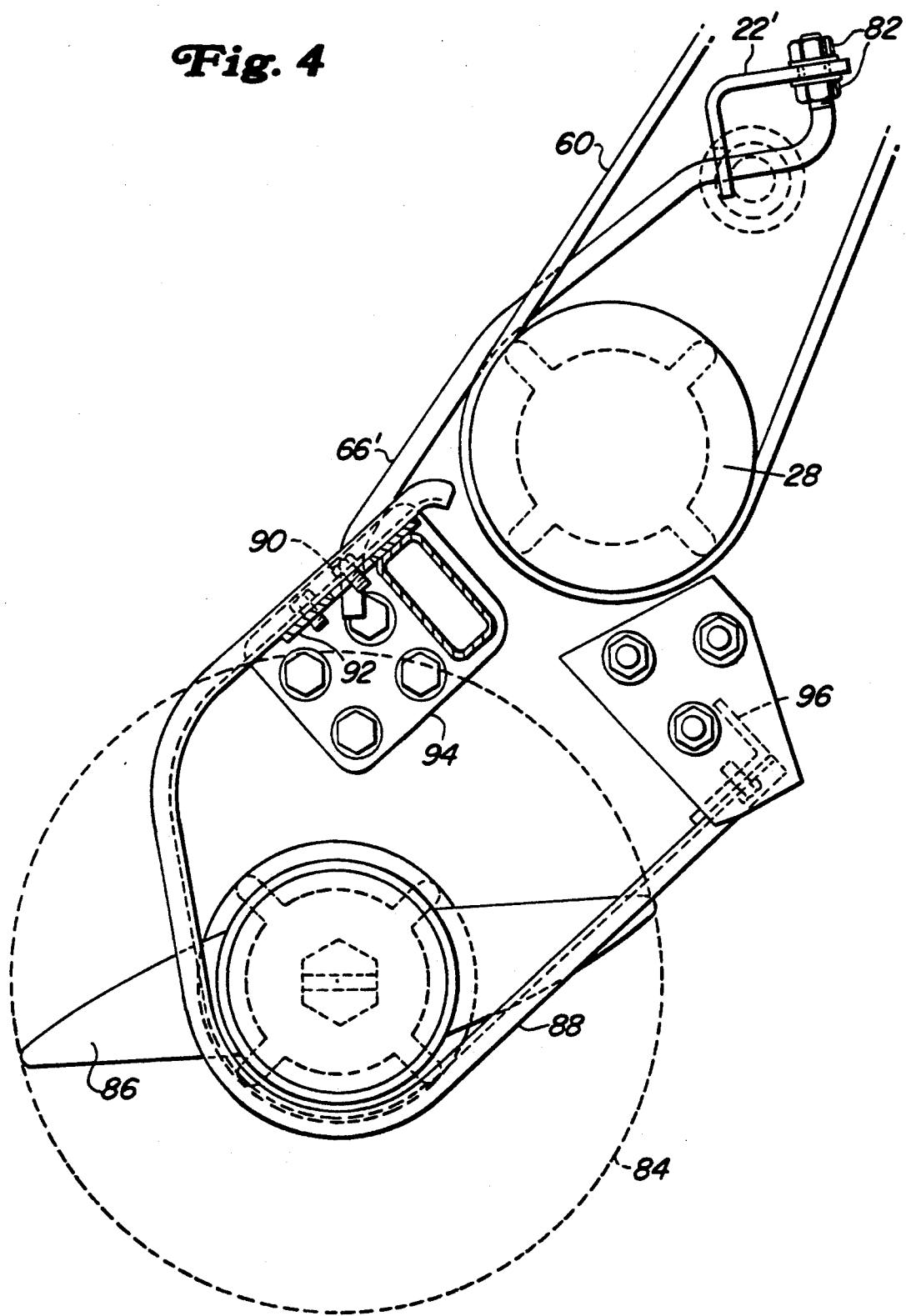
FIG. 4 is a right side elevational view showing the finger assembly in an alternate embodiment of the baler including a feed roll mounted adjacent the lower front belt support roll.

FIG. 4 shows a further embodiment of the round baler 10 wherein a transverse strut 22' is positioned above the roll 28 and forwardly of the belt run 60. The strut 22' is formed from an elongate angle member having a generally horizontal leg joined to and projecting forwardly from a generally vertical leg. A plurality of elongate, rod-like fingers 66' are respectively mounted to the strut 22' at locations spaced therealong to register with the gaps between the belts 58. Specifically, each finger 66' has a right angle bend formed in the upper end thereof, with one leg of the bend being a threaded terminal end of the finger 66' that is received in a hole provided in the generally horizontal leg of the strut 22' and held in place by two nuts 82 respectively tightened against top and bottom surfaces of this strut leg, and with another leg of the bend projecting rearwardly through a hole provided in the generally vertical strut leg. Each finger 66' is angled downwardly and rearwardly from the strut 22' and extends through a respective gap between the belts 58 in the vicinity of the roll 28. Mounted between the walls 14 at a location below and slightly rearwardly of a central axis of the roll 28 is a conveying roll 84 that has radially projecting lugs 86 and may be driven. A plurality of channel-like stripper vanes 88 are formed into a general u-shape and are provided about the conveying roll 84 and between the lugs 86, with an upper leg of each vane being provided with a slot 90 receiving a lower end of a respective one of the fingers 66', so that a smooth transition is achieved between the fingers 66' and the stripper vanes 88. The upper leg of each of the stripper vanes 88 is fastened to a mounting plate 92 forming part of an upper transverse mounting structure 94 extending between the side walls 14 at a location below and rearwardly of the central axis of the roll 28. The mounting plate 92 contains a series of holes in register with the slots 90 and respectively receiving lower ends of the fingers 66'. Lower legs of the stripper vanes 88 are each fastened to a lower support structure 96 mounted between the side walls 14 at a location downwardly and forwardly of the roll 28. The conveying roll 84 is thus positioned for aiding in the delivery of crop to the baling chamber 24.

On the basis of the above description, the operation of the round baler 10 is as follows:

Before the start of a baling operation and before crop to be baled is conveyed by the intake conveyor 48 to the baling chamber 24, the belts 58 will be in the solid line position, illustrated in FIG. 1, with the pivoting frame 44 being in its lowermost position, the first belt span 60 extending in a straight line between the first and third rolls 28 and 52, respectively, and with the second belt span 62 extending in a straight line from the second roll 36 to the roll 34. Hence, the baling chamber 24 is essentially closed in the upward direction in the area of the third roll 52. As soon as crop to be baled is taken up and conveyed to the baling chamber 24, it is engaged by the belts 58, moving in the direction of the arrow, and a vortex of crop develops in the clockwise direction, which leads to the formation of a core for the bale. As soon as the crop is conveyed downward by the first belt span 60, it engages and slides along the fingers 66 and is braked or slowed, so that the vortex is compacted and the formation of the core of the bale is enhanced. At this point the upper portion of the belt span 62 is forced away from the upper portion of the belt span 60 by the forming bale core.

As additional crop enters the baling chamber 24, the pivoting frame 44 is deflected or forced upwardly resulting in the fourth roll 54 being drawn, by the linkage 76, toward the third roll 52, so that the upper portion of the belt span 62 once again approaches the upper portion of the belt span 60 to narrow the baling chamber 24 in its upper region.

It is to be noted that during this formation of the bale, the finger structure or rake 78 spans across the top of the baling chamber between the rolls 52 and 54 and acts to retain crop material within the chamber.

We claim:

1. In a baler for forming large cylindrical bales having a main frame and discharge gate each including opposite side walls, a plurality of belts supported on a plurality of rolls, extending transversely between and mounted to the opposite side walls, so as to define a baling chamber having an opening at its bottom, the belts including a first and second span respectively engaging first and second rolls, located at a front and rear location of the opening, with the first and second spans converging upwardly and respectively passing between confronting surfaces of third and fourth rolls mounted to a belt tensioning frame that extends above the baling chamber and is vertically pivotally mounted for movement toward and away from said chamber opening, the improvement comprising: support means connecting the fourth roll to the tensioning frame for pivotal movement toward and away from said third roll; and controlling means coupled to said fourth roll for increasingly moving the fourth roll toward the third roll as a bale grows in the baling chamber and lifts the tensioning frame.

2. The baler defined in claim 1 wherein said support means comprises a pair of links arranged parallel to each other and having first ends pivotally connected to the tensioning frame and said fourth roll being rotatably mounted between second ends of the pair of links.

3. The baler defined in claim 2 wherein said controlling means includes an elongate member capable of transferring force in tension.

4. The baler defined in claim 3 wherein said elongate member is a flexible element coupled between each of the pair of links and a location on the baler, with the length of each flexible element being chosen such that it moves the fourth roll increasingly toward the third roll as the tensioning frame moves between lowermost and uppermost positions in response to a growing bale located in the baling chamber.

5. The baler defined in claim 4 wherein said location on the baler is between a pivot axis of the tensioning frame on the side walls of the baler and the first roll.

6. The baler defined in claim 1 and further including a rake structure mounted to the tensioning frame in spanning relationship to the third and fourth rolls throughout the length of said rolls whereby crop material is blocked from exiting the baling chamber between said third and fourth rolls.

7. The baler defined in claim 6 wherein said rake structure includes a first set of fingers positioned for extending between adjacent belts of said first and second belt spans.

8. The baler defined in claim 1 wherein said first roll is provided along its length with a plurality of circumferential grooves; and a crop braking structure mounted between said side walls at a location forwardly of said first belt span; said braking structure including a second set of fingers located one each in each of said circumferential grooves and projecting downwardly between the belts of said first span into said opening of said baling chamber.

9. The baler defined in claim 8 wherein the height of said fingers is smaller that the depth of said grooves, whereby the fingers may be disposed so as not to be frictionally engaged with the first roll nor urged into contact with the first roll by a bale being supported by the first roll.

10. The baler according to claim 9 wherein said fingers and the upstream portion of said first span form an obtuse angle, which angle is large enough that a bale of the largest size that the chamber will accommodate does not bear upon the fingers.

11. The baler according to claim 8 and further including a crop conveying roll mounted to the side walls in a location rearwardly of and below said first roll; said crop conveying roll including a plurality of sets of radially projecting lugs spaced axially along the conveying roll; and a plurality of elongate stripper vanes being supported from the side walls such that one each is positioned between adjacent sets of the lugs, with portions of each stripper vane being disposed in overlapping relationship to a lower end portion of a respective one of said second set of fingers so that the vanes and fingers form a substantially smooth crop engaging surface.

12. The baler according to claim 11 wherein each of said vanes is provided with an opening which receives said lower end portion of a respective one of the fingers.

* * * * *